United States Patent Office 3,384,992
Patented May 28, 1968

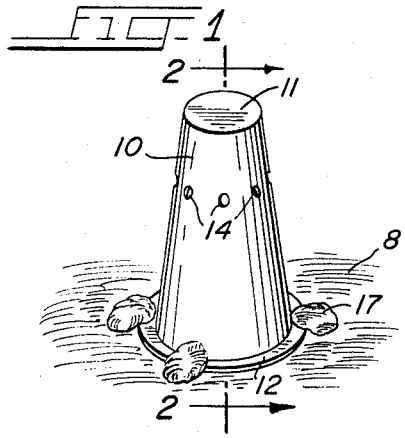
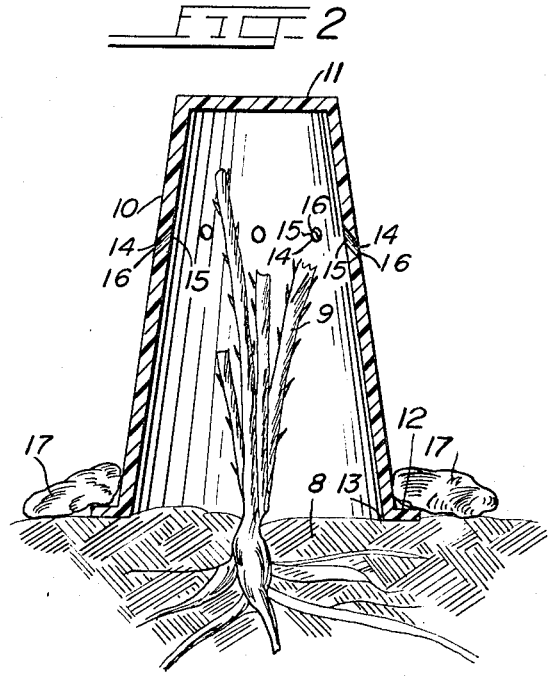
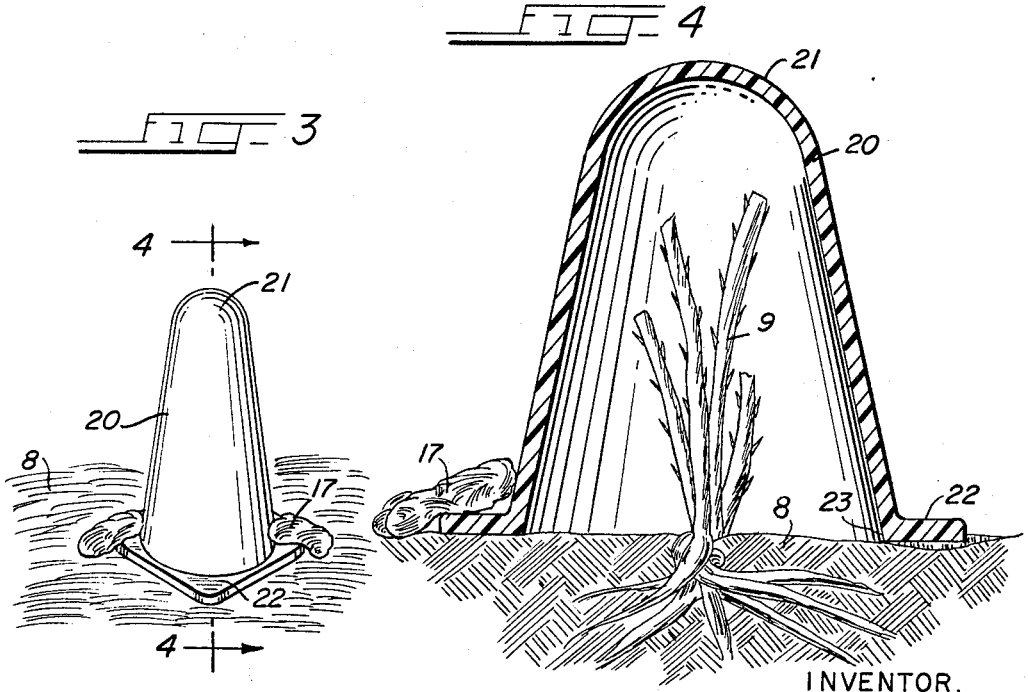

3,384,992
PLANT SHELTER
Howard C. Heffron, Chicago, Ill., assignor, by mesne assignments, to G. I. Plastics Corporation, Chicago, Ill., a corporation of New York
Continuation-in-part of application Ser. No. 226,985, Sept. 28, 1962. This application July 9, 1964, Ser. No. 381,468
2 Claims. (Cl. 47—29)

This invention relates to a shelter for plants to protect said plants from meteorological elements, and more particularly to portable shelters for plants including young bushes annd shrubs for protecting said plants from wind, rain, snow, frost, and sudden temperature changes, and for promoting early growth in the early spring or growing season.

This application is a continuation in part of my copending application, Ser. No. 226,985, filed Sept. 28, 1962, for Shelter for Plants which is now abandoned.

A large number of perennial plants and some annual plants are damaged by drying out or alternately freezing and thawing due to exposure to the action of wind, frost, extreme cold, and sudden temperature changes in the early spring, late fall and winter. The most commonly recognized perennial plants severely damaged by exposure to these elements are the various species of roses. However, there are numerous other perennial, biennial and annual plants which are damaged by such exposure, for example, cultivated figs, hydrages and viburnum, to name a few.

In the past, protection against exposure in winter, early spring, and late fall has been accomplished by munching with materials such as slough hay, hay, straw, sawdust, coco mulch, peat moss, soil, and the like. All of these munching materials have disadvantages which make munching undesirable. For example, mulches such as soil, hay, etc. often carry weed seeds, which are protected by the munch and germinate in the spring providing weeds which must be removed to protect the desired plant. Another disadvantage of these materials is that they are unsightly and are often blown away or spread into other areas by wind or rain. A further disadvantage is that the removal of the mulch after use is accomplished only with difficulty and expense. A still further disadvantage of these mulches is that they can only be used for one reason since they are often too scattered to be collected for reuse or they deteriorate with time or exposure to wind and moisture. Another disadvantage is that these mulches provide an excellent place for the nesting and feeding of mice and other rodents, which often cause considerable injury to the plant being protected. When soil is used as a mulch, excessive moisture in the soil can cause the plant to rot and be damaged thereby. Limited application of straw or hay mulches is often uneconomical since straw and hay is usually obtainable commercially only in bales, necessitating excessive waste.

Transparent or translucent covers are commonly used to protect individual or a group of young plants; these being made of glass or other materials. Such shelters admit sun rays which heat the air and the soil within the shelter. The disadvantage with these arrangements is that the heat of the air within the shelter caused by the sun is quickly dissipated and replaced by cold at night or during a dark period of the day. This might result in the freezing of the plant.

Foam plastic encased in concrete has been employed in the past as plant shelters. This appears to be an improvement over the common munching material, but as is the case with the glass covers the heat obtained from the sun is quickly dissipated during dark periods and offers very little protection from sudden temperature changes.

A disadvantage of the usual plant shelters is that they do not adequately provide for the dissipating of the excess moisture which might accumulate on a bud or a new growth of a plant. During a freeze period, such excess moisture could kill the bud or new growth and also possibly split that part of the plant.

Therefore, it is an object of this invention to provide a shelter for plants which will protect the plant from wind, cold, frost, snow and other meteorological elements.

It is another object of this invention to provide a shelter for plants which is portable and does not deteriorate from the ravages of wind, snow and rain.

A feature of the invention is to provide a shelter having very little (or a slow rate of) heat transfer from inside the shelter to the outside.

Another feature of the invention is to dissipate excess moisture from buds or growing parts of the plant so that a frost will not cause a layer of ice on said buds or parts.

Another feature of the invention is to radiate light rays through the shelter material and thereby permitting the photosynthesis process to take place in an atmosphere within the shelter which is conducive to growth.

According to an embodiment of the invention described hereafter, the shelter comprises a hollow housing having a substantially cone shaped body, a circular bottom with an opening leading into the hollow inside and a dome top. The shelter being so constructed as to admit therethrough rays of the sun to heat the air within the hollow portion and to permit photosynthesis of the plant to take place. The shelter is further characterized by a slow rate of heat transfer from the inner surface to the outer surface of the shelter, threby insulating the plants with the air within the hollow portion.

Other objects and features and a fuller understanding of the invention may be had by referring to the following description, taken in conjunction with the accompanying drawings in which:

FIG. 1 is a fragmentary perspective view of the ground on which a shelter of an embodiment of the present invention is placed.

FIG. 2 is a section on the line 2—2 of FIG. 1.

FIG. 3 is a fragmentary perspective view of the ground on which a shelter of another embodiment of the present invention is placed.

FIG. 4 is a section on the line 4—4 of FIG. 3.

In general, the device of the present invention comprises a hollow tubular structure or housing formed of cellular material such as expanded plastic or polystyrene foam closed at one end which comprises the upper end of the device; the opposed or lower end being open and provided with a flange which may be secured by suitable means to the soil.

Referring to FIG. 1 and FIG. 2 in which is illustrated an embodiment of the invention wherein the plant shelter comprises a hollow conical device suitably in the form of a frustum of a cone of polystyrene foam 10 open at the bottom and closed at the top. The top closure 11 is preferably a disc of expanded polystyrene foam also, and suitably an integral part of the frustum or wall 10 and formed therewith as by molding. An annular flange 12 extends outwardly and horizontally from the bottom edge 13 of the wall 10. The flange 12 is also preferably constructed of polystyrene foam and most preferably formed as an integral part of the frustum 10.

Additionally, a plurality of apertures 14 can be obliquely positioned preferably in the upper half of the wall 10 with the higher opening 15 of the apertures 14 in the inside surface of the conical wall of frustum 10, and the lower opening 16 of the apertures 14 in the outside surface of the conical wall of frustum 10. These apertures 14 are obliquely positioned in the upper half of the conical wall to prevent rain and condensed moisture from flowing into the shelter through apertures 14, and to prevent wind from blowing directly into the shelter through the said apertures. The apertures are positioned to be in proximity of buds or newly grown parts of the plant for dissipating excess moisture and to prevent thereby the killing or breaking off of said buds or parts in the event the plant is subjected to a frost.

With reference to FIG. 3 and FIG. 4, the drawings show another embodiment of the invention. The plant shelter comprises a substantially conical wall structure 20 of polystyrene foam open at the bottom and closed at the top. The top closure 21 is preferably a dome shape of polystyrene foam and integrally a part of the wall 20. A substantially square flange 22 extends outwardly and horizontally from the bottom edge 13 of the wall 20. The flange 22 is also preferably constructed of polystyrene foam and most preferably formed as an integral part of the wall 20. The flange being substantially square extends out further from the bottom edge at four places and thereby provides at such places convenient locations for the anchoring of the shelter to the soil.

In the usual application of the shelters of the present invention and with reference, for example, to FIG. 1, and FIG. 2, the plant 9 is pruned, as normally required by the plants to survive the winter season, and the open end 13 of the shelter is placed over the plant. For effective application, the bottom edge 13 and flange 12 should be in intimate contact with the ground 8. If such contact is not accomplished by the placing of the shelter on the ground, the soil can be smoothed or filled as required. The shelter is then anchored to the ground by suitable means, for example such as by a plurality of rocks or large stones 17 placed on flange 12 and if desired partially resting on the ground. The shelter can also be anchored by a plurality of spokes or screws (not shown) driven through flange 12 and into the ground.

Cellular material such as expanded plastic or in particular polystyrene foam provides little or very small heat transfer by means of conduction from its inner surface to its outside surface. Therefore, a plant covered by such material is protected from sudden temperature changes from the outside. When such material is thin in thickness, it is translucent and thereby admits radiant energy and in particular light rays. On the other hand, increasing the thickness of the material could cause such material to become opaque or substantially less translucent and thereby more impervious to radiant energy. However, with the increased thickness, heat transfer by conduction is correspondingly decreased. Therefore, by having the entire cellular material of the shelter opaque, by increasing the thickness, less heat conduction would occur than if such shelter were partially opaque and partially translucent or entirely translucent.

The shelters or embodiments of the invention were used in the winter and were extremely successful in eliminating dead shrubs due to the cold and the other harmful elements of nature.

Shrubs and plants which were covered by the shelters during the spring or early part of the growing season had substantially more foliage than the uncovered plants. Comparative tests showed that sheltered rose plants were approximately six weeks ahead of unsheltered rose plants. It is noted, that the growth of the plants took place even though there were no openings extending through the shelter walls from the outside surface to the inner surface. Such a shelter is illustrated in the embodiment of FIG. 3 and FIG. 4.

Based upon the foregoing successful usage of the shelters, the following theory is advanced. When the shelter structure is composed of a translucent expanded plastic as polystyrene foam, it transmits sunlight which heats the air inside the shelter by radiation and also permits the process of photosynthesis to take place during the growing season. The expanded plastic having superior insulating qualities provides little or at least substantially slow heat transfer from inside the shelter to the outside. Any heat which is lost by conduction during the night or dark periods of the day is subsequently replenished by radiant energy when light appears. In this manner, a warm pocket of air is almost continually present to protect the plant from sudden weather changes. This warm air acting in conjunction with light being transmitted through the shelter appears quite conducive to plant growth during and immediately before the growing season.

As was stated above, growth of the plant took place within the shelter without having ventillating holes included therein. Apparently, enough air is getting through the shelter to satisfy the requirement of plant growth.

The shelter of the present invention protects the plant from rain, wind, snow and frost by physically covering the exposed portions of the plant and by being impervious to such elements. In addition, the shelter provides insulation against sudden increases and decreases in temperature. The shelter of this invention is relatively permanent in that it will not scatter or blow away, and is economical in that it can be reused since it is not deteriorated by the action of rain, wind and snow.

While the present invention has been described with respect to particular embodiments, this description is intended in no way to limit the scope of the invention.

What is claimed is:

1. A shelter device for protecting plants in the earth from cold, wind, and sudden temperature changes of the air comprising:

a hollow frusto conical shaped housing formed from polystyrene foam material, said housing having an open bottom end of circular shape and a top section including a circular top end, said circular bottom end being larger cross-sectional area than said circular top end, the material of said housing being of substantial thickness to afford an outside surface and an inner surface;

an annular flange integrally formed to said bottom end for contacting said ground and extending horizontally outward therefrom;

said polystyrene foam material characterized by its ability to admit radiant energy therethrough for heating the air inside said housing and to provide by conduction a substantially slow rate of heat transfer from said inner surface to said outer surface, thereby insulating said plants and the air within said housing from the outer atmosphere; and said top section including apertures extending obliquely through said structure in a downward direction from said inner surface to said outer surface for preventing unwanted water and winds from entering therethrough.

2. A shelter device for protecting plants in the earth from cold, wind, and sudden temperature changes of the air comprising:

a hollow housing having an open bottom end circular in shape, the top end of said housing being dome shaped, said housing increasing in diameter from said top end to said bottom end, the material of said housing being of substantial thickness to afford an outside surface and an inner surface;

a substantially square flange integrally formed to said bottom end and extending outward from said bottom end for contacting said earth and for anchoring said flange to said earth; and said material being constructed of polystyrene foam to admit radiant energy from said outside surface to said inner surface for heating the air inside said housing and to provide a substantially slow rate of heat transfer from said inner surface to said outside surface so that said plants and the air within the housing are insulated from the outer atmosphere.

References Cited

UNITED STATES PATENTS

| | | | |
|---|---|---|---|
| 561,824 | 6/1896 | Siskron | 47—29 |
| 1,432,339 | 10/1922 | Jones | 47—28 |
| 1,814,339 | 7/1931 | Sato | 47—29 |
| 1,910,828 | 5/1933 | Flanders | 47—28 |
| 1,930,939 | 10/1933 | Horner. | |
| 1,940,020 | 12/1933 | Schnindler | 47—29 |
| 2,691,848 | 10/1954 | Arena. | |
| 3,218,759 | 11/1965 | Barrons | 47—30 |

FOREIGN PATENTS

| | | |
|---|---|---|
| 1,137,129 | 1/1957 | France. |
| 59,521 | 4/1957 | India. |

OTHER REFERENCES

Koppers Expandable Polystyrene, 1954, Koppers Co., Inc. (p. 5, 7 and 16).

ROBERT E. BAGWILL, *Primary Examiner.*

T. GRAHAM CRAVER, ANTONIA F. GUIDA,
*Examiners.*

R. L. HOLLISTER, F. B. HENRY, *Assistant Examiners.*